(12) United States Patent
Hmimy et al.

(10) Patent No.: US 10,785,811 B2
(45) Date of Patent: Sep. 22, 2020

(54) WIRELESS BASE STATIONS AND BACKHAUL MANAGEMENT

(71) Applicant: Charter Communications Operating, LLC, St. Louis, MO (US)

(72) Inventors: Hossam H. Hmimy, Allen, TX (US); Manish Jindal, Plano, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 15/978,600

(22) Filed: May 14, 2018

(65) Prior Publication Data

US 2019/0350013 A1 Nov. 14, 2019

(51) Int. Cl.
| | |
|---|---|
| *H04W 4/00* | (2018.01) |
| *H04W 76/10* | (2018.01) |
| *H04W 72/04* | (2009.01) |
| *H01Q 21/00* | (2006.01) |
| *H01Q 1/24* | (2006.01) |
| *H04W 88/08* | (2009.01) |

(52) U.S. Cl.
CPC ........... *H04W 76/10* (2018.02); *H04W 72/04* (2013.01); *H01Q 1/246* (2013.01); *H01Q 21/00* (2013.01); *H04W 88/08* (2013.01)

(58) Field of Classification Search
CPC .............................. H04W 88/08; H01Q 21/00
See application file for complete search history.

(56) References Cited

U.S. PATENT DOCUMENTS

| | | | |
|---|---|---|---|
| 2016/0381585 A1* | 12/2016 | Dudzinski | F16M 11/06 370/252 |
| 2017/0093693 A1* | 3/2017 | Barzegar | H04L 45/24 |
| 2018/0166770 A1* | 6/2018 | Frigon | H01Q 1/2291 |
| 2019/0090273 A1* | 3/2019 | Yoo | H01Q 1/246 |

* cited by examiner

*Primary Examiner* — Bo Hui A Zhu
(74) *Attorney, Agent, or Firm* — Armis IP Law, LLC

(57) ABSTRACT

According to one configuration, a system includes resources in which to configure a base-band manager, a first virtual radio, a second virtual radio, and a third virtual radio. The first virtual radio is coupled to a first set of antenna elements of antenna hardware, which provide wireless connectivity to first communication devices in a first wireless coverage region. The second virtual radio is coupled to a second set of antenna elements of the antenna hardware, which provide wireless connectivity to second communication devices in a second wireless coverage region. The third radio communication hardware is coupled through a third set of antenna elements of the antenna hardware to a primary backhaul in communication with a remote network. The base-band manager couples the first virtual radio and the second communication resource to the third virtual radio, providing the first communication devices and the second communication devices access to a remote network.

27 Claims, 13 Drawing Sheets

| VIRTUAL RADIO | ANTENNA INTERFACE | ANTENNA ELEMENTS | WIRELESS COVERAGE REGION | SECTOR COVERAGE ANGLE | POWER LEVEL (% of MAX) |
|---|---|---|---|---|---|
| 120-1 | 132-1..(X) | A11, A12, A13 | 160-1 | 90-135 deg | 100% |
| 120-2 | 132-2..(Y) | A31, A41 | 160-2 | 135-225 deg | 100% |
| 120-3 | 132-3..(Z) | A61, A62, A63 | 160-3 | 225-270 deg | 75% |

CONFIGN. SETTINGS 111-1

FIG. 2

| VIRTUAL RADIO | ANTENNA INTERFACE | ANTENNA ELEMENTS | WIRELESS COVERAGE REGION | SECTOR COVERAGE ANGLE | POWER LEVEL (% of MAX) |
|---|---|---|---|---|---|
| 120-1 | 132-1 | A11, A12, A13 .(X) | 160-1 | 90-135 deg | 100% |
| 120-2 | 132-2 | A31, A41...(Y) | 160-2 | 135-225 deg | 100% |
| 120-3 | 132-3 | A61, A62, A63...(Z) | 160-3 | 225-270 deg | 75% |
| 120-4 | 132-4 | A14, A15, A16...(W) | 160-4 | 0-90 deg | 100% |

CONFIGN. SETTINGS 111-2

FIG. 7

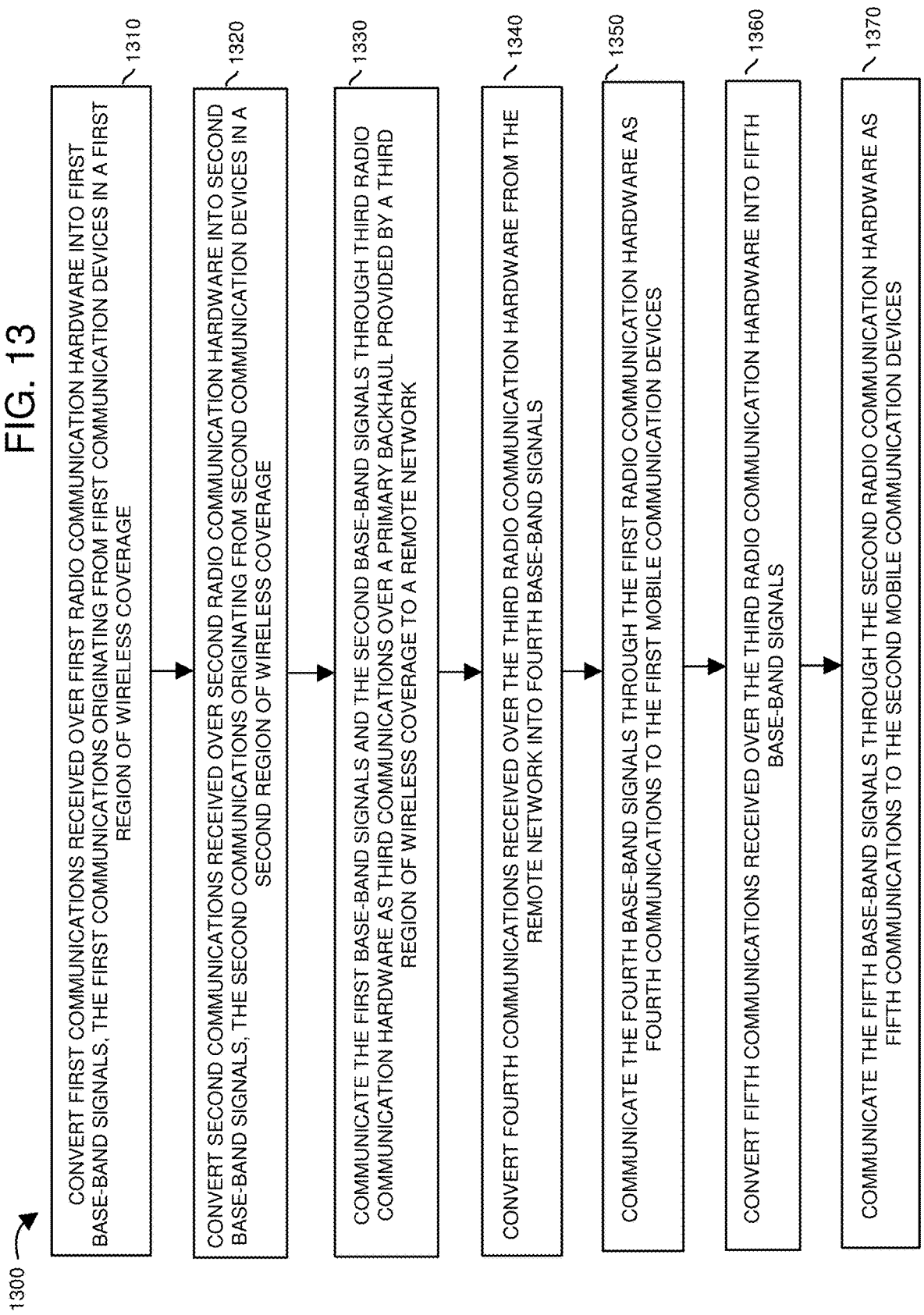

WIRELESS BASE STATIONS AND BACKHAUL MANAGEMENT

BACKGROUND

Conventional wireless networks typically include one or more wireless base stations to provide mobile communication devices access to a remote network services such as the Internet. During operation, conventional base stations are configured to provide wireless coverage in an allocated portion of a geographical region.

For example, a first base station in a wireless communication system can be physically configured to provide wireless coverage between a 0 to 70 degree sector; a second base station in the wireless communication system can be configured to provide wireless coverage (sector) in a 70 to 160 degree sector; and so on.

In such an instance, antenna hardware associated with the first base station is physically mounted in a fixed manner to provide wireless coverage between 0 and 70 degrees in the geographical region; antenna hardware associated with the second base station is physically mounted in a fixed manner to provide wireless coverage between 70 and 160 degrees in the geographical region; and so on.

In this way, conventional base stations and corresponding antenna hardware can be configured to provide wireless connectivity in different sectors of a geographical region. Typically, each of the multiple base stations are in communication with a remote network such as the Internet via one or more backhaul links.

BRIEF DESCRIPTION OF EMBODIMENTS

There are deficiencies associated with conventional techniques of providing wireless connectivity to users. For example, each conventional base station is typically implemented to support wireless communications in a predetermined, fixed region. In order to change coverage of a wireless access point, the base station and/or a respective antenna device must be physically modified to cover the newly allocated wireless region. It is a time-consuming endeavor to re-design and physically install updated base stations and antenna devices to accommodate ever-changing network conditions.

Embodiments herein provide novel ways of providing improved wireless communications to one or more mobile communication devices and providing corresponding connectivity to a respective backhaul.

More specifically, in one embodiment, a wireless communication system includes hardware and software resources in which to dynamically configure one or more base-band managers, a first virtual radio, a second virtual radio, a third virtual radio, etc. In one embodiment, the first virtual radio (instantiation of first radio communication hardware and software) is coupled to a first set of antenna elements of corresponding antenna hardware. The first set of antenna elements provides wireless connectivity to first communication devices in a first wireless coverage region.

The second virtual radio (instantiation of second radio communication hardware and software) is coupled to a second set of antenna elements of the antenna hardware. The second set of antenna elements provides wireless connectivity (such as via secondary backhaul) to second communication devices in a second wireless coverage region.

The third virtual radio (instantiation of third radio communication hardware and software) is coupled through a third set of antenna elements of the antenna hardware to a primary backhaul in communication with a remote network.

The base-band managers couple any number of virtual radios (base station) such as the first virtual radio, the second virtual radio, etc., to the third virtual radio in order to provide the first communication devices, the second communication devices, etc., access to a remote network through the primary backhaul supported by the third virtual radio.

Configuration of the communication system as discussed herein can be modified to accommodate different network topologies. For example, existing wireless capability can be adjusted via instantiation of additional or fewer base-band managers and base stations. Other configuration adjustments can include: supporting wireless communications over different carrier frequencies, increasing or decreasing a size of wireless coverage provided by each of one or more base stations, increasing or decreasing wireless transmitter power associated with each of one or more base stations, etc.

Embodiments herein are useful over conventional techniques. For example, the dynamic configuration of radio communication hardware and corresponding antenna hardware to implement multiple virtual radios and corresponding base-band managers provide more efficient use of wireless resources in a network environment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate dynamic implementation of virtual radios (base stations) and connectivity to one or more backhauls to a core network. The instructions, when executed by computer processor hardware, cause the computer processor hardware (such as one or more co-located or disparately processor devices) to: control first radio communication hardware coupled to antenna hardware to provide wireless connectivity to communication devices in a network environment; control second radio communication hardware coupled to the antenna hardware to provide backhaul connectivity to a remote network; and via base-band management hardware coupling the first radio communication hardware and the second radio communication hardware, manage communications between the communication devices and the remote network.

Another embodiment includes a computer readable storage medium and/or system having instructions stored thereon to facilitate dynamic implementation of base stations. The instructions, when executed by computer processor hardware, cause the computer processor hardware (such as one or more co-located or disparately processor devices) to: convert first communications received over first radio communication hardware into first base-band signals, the first communications originating from first communication devices in a first region of wireless coverage; convert second communications received over second radio communication hardware into second base-band signals, the second communications originating from second communication devices in a second region of wireless coverage; communicate the first base-band signals and the second base-band signals (on one or more respective carrier frequencies) through third radio communication hardware as third communications over a primary backhaul provided by a third region of wireless coverage to a remote (core) network. In accordance with further embodiments, the computer processor hardware is further operable to: convert fourth communications received over the third radio communication hardware from the remote network into fourth base-band signals; communicate the fourth base-band signals (on one or more respective carrier frequencies) through the first radio communication hardware as fourth communications to the first mobile communication devices; convert fifth communications received over the third radio communication hardware into fifth base-band signals; and communicate the fifth base-band signals (over one or more carrier frequencies) through the second radio communication hardware to the second mobile communication devices.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating generation of first configuration settings according to embodiments herein.

FIG. 7 is an example diagram illustrating generation of second configuration settings according to embodiments herein.

FIGS. 12-13 are example diagrams illustrating methods according to embodiments herein.

Figure 1:
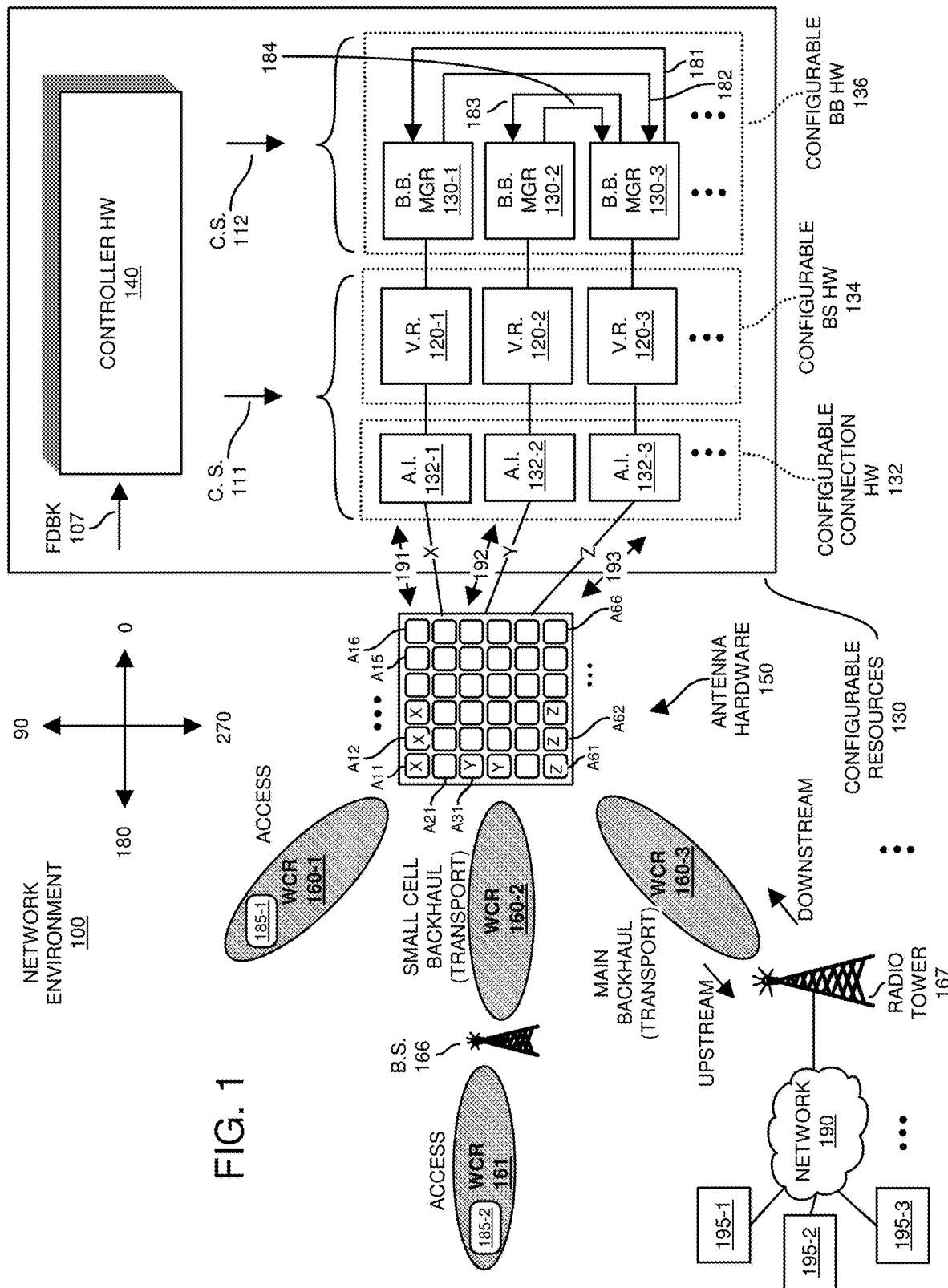
FIG. 1 is an example diagram illustrating a wireless network environment and dynamic operation of same according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a communication system includes configurable resources in which to configure a base-band management system such as one or more base-band managers and multiple virtual radios such as a first virtual radio, a second virtual radio, a third virtual radio, etc. Each of the multiple virtual radios is assigned use of antenna elements. Based on first configuration settings, the first virtual radio is coupled to a first set of antenna elements of antenna hardware, which provides wireless connectivity to first communication devices in a first region of wireless coverage; the second virtual radio is coupled to a second set of antenna elements of the antenna hardware, which provides wireless connectivity (such as for backhaul or transport) to second communication devices in a second region of wireless coverage; the third virtual radio is coupled through a third set of antenna elements of the antenna hardware to a primary backhaul in communication with a remote network. The base-band management system couples the first virtual radio and the second communication resource to the third virtual radio, providing the first communication devices and the second communication devices access to a remote network through the primary backhaul.

As further described herein, the communication system can be reconfigured as needed to provide different regions or numbers of wireless coverage to zones of multiple communication devices. As previously discussed, each of the zones of communication devices coupled to a remote network through the primary backhaul.

Now, more specifically, FIG. 1 is an example diagram illustrating a wireless network environment and dynamic implementation of different base station configurations according to embodiments herein.

In this example embodiment, the communication system in network environment 100 includes controller hardware 140, configurable resources 130 (such as radio communication hardware), and antenna hardware 150 to support wireless communications with one or more communication devices (e.g., handheld mobile communication devices, fixed dish antenna communication devices, non-mobile communication devices, etc.) in network environment 100.

As further discussed below, each of the controller hardware 140, configurable resources 130, etc., includes hardware and executes corresponding software instructions to carry out different functions.

Note that, in one embodiment, the controller hardware 140 is instantiated in the configurable resources 130 or separate dedicated radio communication hardware.

In this example embodiment, antenna hardware 150 includes multiple independent antenna elements A11, A12, A13, . . . , A21, A22, A23, . . . , A61, A62, A63, A64, A65, and A66, combinations of which support bi-directional communications in any angular direction using beam-forming techniques.

In the present example, the antenna hardware 150 includes a two-dimensional array of antenna elements such as shown, in this example, a 6×6 array of antenna elements. Note that use of a 6×6 array of antenna elements is shown by way of non-limiting example only. The antenna hardware 150 can include any sized array of antenna elements and any number of dimensions.

In one embodiment, the antenna hardware 150 is configured as a single panel of antenna elements (two dimensional array). As further described herein, each of one or more sets of antenna elements associated with antenna hardware 150 can be allocated to support the same or different types of wireless connectivity.

For example, as further described herein, a first set of antenna elements can be configured to provide wireless connectivity to a group of communication devices 185-1 (stationary or mobile) in wireless coverage region 160; a second set of antenna elements can be configured to provide wireless connectivity (secondary or small cell backhaul via wireless coverage region 160-2) to a base station 166 that itself services a group of multiple mobile communication devices 185-2 in wireless coverage region 160; a third set of antenna elements can be configured to provide wireless connectivity (such as a primary backhaul or transport link via wireless coverage region 160-3) to radio tower 167. Radio tower 167 provides connectivity of the primary backhaul (provided by the wireless coverage region 160-3) to the remote network 190 (such as a core network).

Each antenna element Axy (where x=row, y=column) in the antenna hardware 130 is capable of transmitting and receiving wireless signals. As further discussed below, different groupings of antenna elements can be assigned to provide different angular regions of wireless coverage (a.k.a., sectors) in a respective wireless network.

In one embodiment, the antenna hardware 130 (such as a single panel) is disposed at a single, central location in the wireless network environment. In accordance with alternative embodiments, the antenna hardware and corresponding antenna elements are disparately located components in network environment 100.

The antenna hardware 130 supports transmission and receipt of wireless communications in any angular direction. As further discussed below, different groupings of the antenna elements can be dynamically selected as needed to support different or changing configurations of wireless coverage. In one embodiment, controller hardware 140 receives feedback 107 (input) indicating current network conditions and/or commands indicating how to reconfigure the number, size, carrier frequencies, etc., associated with wireless coverage regions 160.

Desired wireless signal directivity and wireless coverage associated with a virtual radio and corresponding antenna elements is achieved by combining assigned elements in an antenna array (of antenna elements) in such a way that emitted wireless signals at particular angles experience constructive interference while others experience destructive interference. Beam-forming can be used at both transmitting and receiving antenna elements in order to achieve spatial selectivity.

In accordance with further example embodiments, configurable hardware 130 (such as radio communication hardware) includes configurable connection hardware 132 and configurable virtual radio (base station) hardware 134 to instantiate virtual radios and corresponding connectivity with sets of antenna elements.

Configurable hardware 130 further includes configurable base-band hardware 136 in which to instantiate one or more base-band managers 130 (such as base-band manager 130-1, base-band manager 130-2, base-band manager 130-3, etc.).

The ability to configure antenna interfaces, virtual radios, and base-band managers in the radio communication hardware 130 and antenna hardware 150 enables the network controller hardware 140 to dynamically adjust, via configuration settings, wireless services (such as size of wireless coverage regions, number of wireless coverage regions, etc.) without having to physically adjust the antenna elements and/or base station hardware as is required by conventional communication systems. Thus, if a current implementation of multiple virtual radios (base stations) does not provide appropriate services to mobile communication devices, the controller hardware 140 appropriately modifies the configuration settings 111 and/or configuration settings 112 to correct any shortcomings.

In this example embodiment, the configurable base station hardware 134 includes any suitable resources such as computer processor hardware, data storage hardware, applications, software instructions, etc., in which to implement any of one or more virtual radios 120 (such as base stations) and corresponding functionality. Configuration of resources such as virtual radios and base-band managers can include selecting and configuring appropriate hardware in the configurable resources 130 and then applying the configured hardware to carry out desired operations associated with the base-band manager and the virtual radios.

Each virtual radio (base station) can be configured to operate independently of the other virtual radios 120. As further discussed herein, each base station can be assigned any number of antenna elements associated with antenna hardware 150 in order to provide desired wireless connectivity (transmit and receive capability) to respective users or another base station (such as base station 166) in a defined region of wireless coverage. In one embodiment, each instantiated virtual radio 120 provides wireless connectivity via one or more dynamic sectors of wireless coverage.

As its name suggests, and as previously discussed, the configurable connection hardware 132 provides configurable connectivity between the virtual base stations 120 and the antenna hardware 150. More specifically, each virtual radio is assigned one or more antenna elements is operable to transmit and/or receive wireless communications from one or more communication devices.

In accordance with further embodiments, to support wireless communications, the controller hardware generates configuration settings 111 to control settings of the radio communication hardware 130 coupled to the antenna hardware 150. The configuration settings 111 indicate one or more (virtual radios) base stations to be instantiated by the radio communication hardware 130.

As previously discussed, the antenna hardware 150 can be configured to include multiple antenna elements to wirelessly communicate (transmit and receive wireless signals) in the network environment 100. The controller hardware 140 applies the configuration settings 111 to the configurable radio communication hardware (such as configurable connection hardware 132 and configurable base station hardware 134) to define corresponding wireless coverage (such as angle of coverage, communication range/distance with respect to a antenna hardware/base station, etc.) to be provided by each of virtual radios 120 in the network environment 100.

Subsequent to being instantiated, the virtual radios 120 (as configured by the controller hardware 140) provide different groupings of one or more communication devices in the network environment access to a remote network 190 such as the Internet, cellular network, etc.

In one embodiment, in addition to defining the one or more virtual radios 120 to be implemented by the configurable resources 130 (hardware and software resources), the controller hardware 140 produces the configuration settings 111 to indicate a respective grouping of the antenna elements in antenna hardware 150 assigned for use by each of the multiple virtual radios (base stations) 120.

In accordance with the configuration settings 111, the configurable connection hardware 132 (such as via a respective antenna interface 132) provides connectivity between the virtual stations and respective groupings of antenna elements. As previously discussed, and as its name suggests, the settings of the configurable connection hardware 132 can be selected to connect a respective virtual radio to any of one or more antenna elements associated with antenna hardware 150.

As further discussed herein, the configuration settings 111 are adjustable over time to redefine virtual radios 120 (base stations, wireless access points, etc.) instantiated by the configurable base station hardware 134 and corresponding provided wireless coverage in the wireless network environment 100. Accordingly, one embodiment herein includes modifying the configuration settings 111 (such as number of base stations, wireless access points, etc., and corresponding wireless coverage) on as-needed basis depending on network conditions.

In accordance with further embodiments, the controller 140 can be configured to receive feedback 107 from one or more resources such as virtual radios 120, communication devices, service provider's network management personnel, etc.

Feedback 107 can indicate any suitable information such as the number of mobile communication devices serviced in a respective wireless coverage region, number of communication devices serviced by a respective base station, locations of communication devices, etc.

Figure 6:
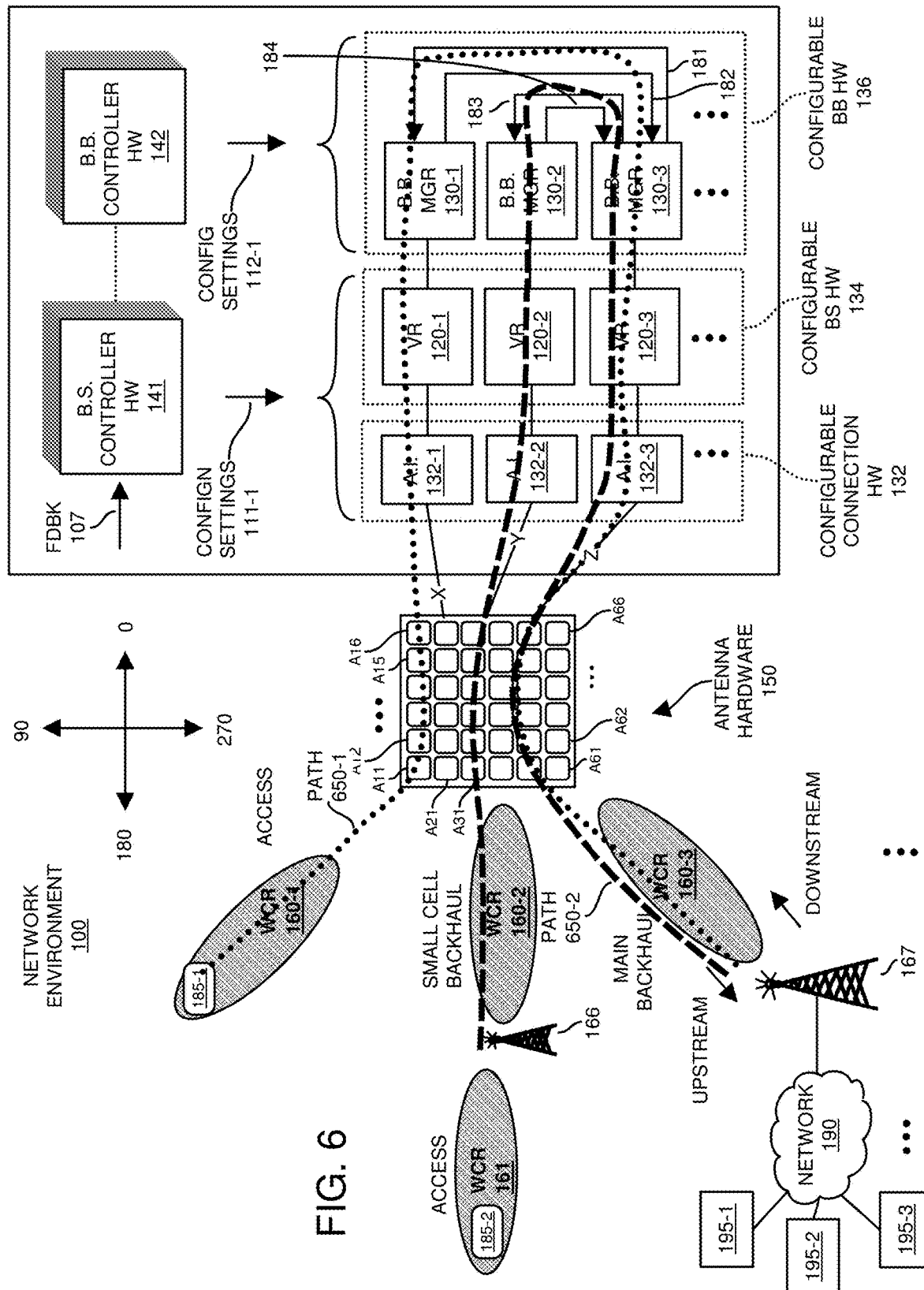
FIG. 6 is an example diagram illustrating an implementation of a configurable wireless network using the first configuration settings according to embodiments herein.
Figure 9:
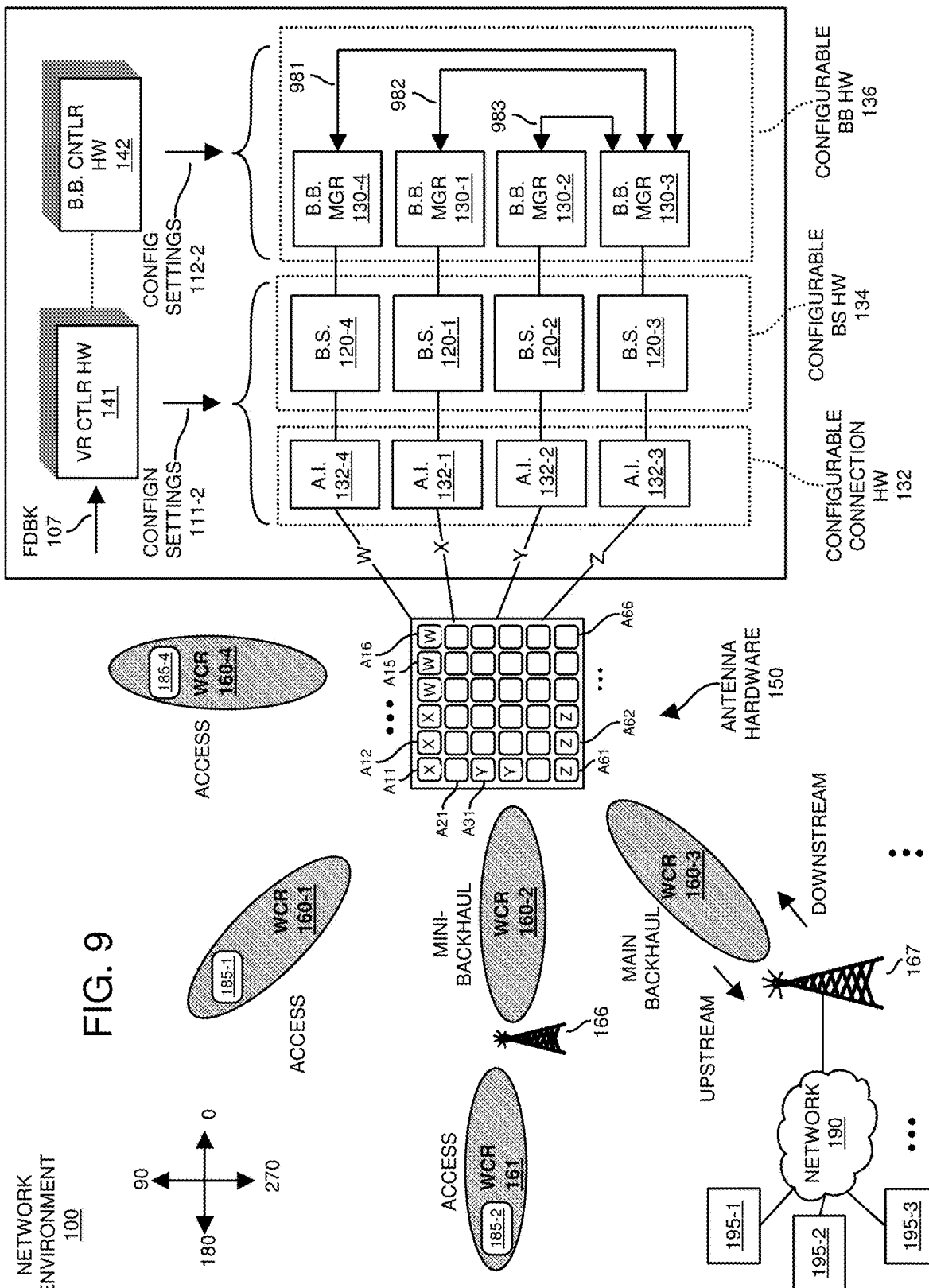
FIG. 9 is an example diagram illustrating an implementation of the configurable wireless network using the second configuration settings according to embodiments herein.

The controller 140 or other suitable resource can be configured to make decisions, such as based on feedback 107 or any other control input, as to how to partition use of configurable resources 130 to provide desired wireless connectivity/support. Thus, in one embodiment, based on the feedback 107, and detected changing network conditions and needs, the base station controller hardware 140 updates the configuration settings 111 to provide efficient use of wireless resources (such as bandwidth) in the network environment 100. FIG. 6 illustrates instantiation of a first wireless network providing first wireless connectivity while FIG. 9 illustrates instantiation of a second wireless network providing second wireless connectivity.

Referring again to FIG. 1, note further that the virtual radios 120 (base stations) and corresponding antenna hardware 150 can be configured to support the same of different types of communications such as LTE 5G NR communications, WiFi™ communications, etc.

In one embodiment, one or more of the virtual radios 120 supports communication over the CRBS (Citizen Radio Band Service) such as in the 3.5 GHz band (around 3550-3700 MHz) using LTE communications. In such an instance, each virtual radio is assigned a corresponding CRBS identifier value. The band can be configured to support different carrier frequencies; each virtual radio (base station or wireless access point) is assigned one or more of the carrier frequencies in the band to support wireless communications. Alternatively, the virtual radios 120 (base stations, wireless access points, etc.) and corresponding antenna hardware 150 can be configured to support any other suitable types of wireless communications.

In accordance with still further embodiments, each virtual radio and corresponding assigned set of one or more antenna elements can be configured to transmit wireless communications up to a maximum allowed EIRP (Effective Isotropic Radio Power) level for the given band. Increasing the number of instantiated virtual radios allows for an increased amount of wireless power to communicate in a given region serviced by the antenna hardware 150. For example, each instantiated base station can be configured to transmit at a same, maximum wireless power level as a second portion of the antenna elements assigned to a second instantiated base station. Thus, instantiation of more base stations enables the radio communication hardware to transmit communications at an overall higher power density in the region.

If desired, at least portions of the wireless coverage (as indicated by wireless coverage regions 160) provided by the multiple virtual radios 120 as defined by the configuration settings 111 are non-overlapping with respect to each other. For example, the controller hardware 140 can be configured to define a first wireless virtual radio 120-1 to provide wireless connectivity to a first group of communication devices 185-1 in a first wireless coverage region 160-1 such as in an angular range between 90-135 degrees; the controller hardware 140 can be configured to define a second wireless virtual radio 120-2 to provide wireless connectivity (such as a small cell backhaul transport) to a remote base station 166 that supports wireless connectivity to a second group of communication devices 185-2 in the second wireless coverage region 160-2 such as in an angular range between 135-225 degrees; the controller hardware 140 can be configured to define a third virtual radio 120-3 to provide wireless connectivity (such as over a primary backhaul transport link) to a radio tower 167, providing connectivity to a corresponding network 190 via a third wireless coverage region 160-3 such as in an angular range between 170-280 degrees.

Alternatively, if desired, note that one or more of the wireless coverage regions 160 can be overlapping with respect to each other such as using different assigned carrier frequencies.

Thus, the controller hardware 140 can be configured to generate configuration settings 111 to define attributes of the multiple virtual radios and corresponding wireless coverage depending on locations and/or wireless usage associated with multiple communication devices in the network environment. For example, the controller hardware 140 can be configured to define the number of different virtual radios (base stations, a number of which can change over time) and corresponding wireless coverage regions instantiated by the configurable base station (virtual radio) hardware 134 and connectivity provided by configurable connection hardware 132 of configurable resources 130 depending on one or more attributes such as a number of communication devices to be serviced, density of communication devices in each of multiple regions to be provided wireless service, locations of communication devices, bandwidth requirements of the communication devices, etc.

In accordance with further embodiments, as shown, the controller 140 is further operable to generate configuration settings 112 defining attributes of base-band hardware and software associated with base-band managers 130-1, 130-2, and 130-3 (collectively, base-band managers 130).

Note that the (virtual) base-band managers can be instantiated at any suitable location such as in the cloud, local with respect to the virtual radios, etc.

Additionally, note that the communication system as discussed herein can be configured to support any of secondary backhauls (wireless transport links) to respective small or large cell base stations serving corresponding sets of communication devices. The communication system also can be configured to support any number of virtual radios that provide respective communication devices access to the remote network. The base-band manager such as base-band manager 130-3 aggregates the upstream data from the one or more virtual radios (supporting one or more secondary backhauls, access, etc.) and communicates them upstream to a remote network 190. In a downstream direction, the base-band manager 130-3 separates the appropriate downstream data to appropriate secondary backhaul links or access links supporting end users.

More specifically, as further discussed herein in the example of FIG. 1, the base-band manager 130-1 receives upstream communications from communication devices 185-1 through a combination of antenna elements (A11, A12, and A13 and link X), antenna interface 132-1, and virtual radio 120-1 and converts (such as via removal of physical layer 1 information in the Open Systems Interconnect model) the received communications into base-band communications 182 and transmits the base-band communications 182 to base-band manager 130-3. Base-band manager 130-3 then communicates the base-band communications 182 over an appropriate physical layer to virtual radio 120-3 that communicates the base-band communications 182 upstream over antenna elements A61, A62, and A63 over the main transport backhaul (as provided by wireless coverage region 160-3) to radio tower 167, which communicates the corresponding data to network 190 for further distribution to target recipients.

In a reverse direction, the base-band manager 130-3 receives downstream communications from network 190 directed to the mobile communication device 185-1. The downstream communications are transmitted from network 190 through a combination of the primary backhaul (wireless coverage region 160-3), antenna elements (A61, A62, and A63), antenna interface 132-3, and virtual radio 120-3 to the base-band manager 130-3. The base-band manager 130-3 converts (such as via removal of physical layer 1 information) the received downstream communications from virtual radio 120-3 into base-band communications 181 and transmits the base-band communications 181 to base-band manager 130-1. Base-band manager 130-1 then further communicates the base-band communications 181 (over an appropriate carrier frequency) to virtual radio 120-1 that communicates the corresponding downstream communications to the communication devices 185-1 through antenna interface 132-1, and antenna elements (A11, A12, and A13).

Base station 166 receives communications from communication devices 185-2 and forwards them over the secondary backhaul (wireless coverage region 160-2) to the virtual radio 120-2. The virtual radio 120-2 forwards the communications to the base-band manager 130-2. Thus, the base-band manager 130-2 receives upstream communications from communication devices 185-2 through a combination of base station 166, antenna elements (A21, A22), antenna interface 132-2, and virtual radio 120-2. Base-band manager 130-2 converts (such as via removal of physical layer 1 information) the received communications into base-band communications 184 and transmits the base-band communications 184 to base-band manager 130-3 for further processing. Base-band manager 130-3 then communicates the base-band communications 184 to virtual radio 120-3 that communicates the corresponding data of the corresponding upstream communications from communication devices 185-2 through virtual radio 120-3, antenna interface 132-3, and antenna elements (A61, A62, and A63) over the main transport backhaul (supported by wireless coverage region 160-3) to radio tower 167 and network 190.

In a reverse direction, the base-band manager 130-3 receives downstream communications to the communication device 185-2 through a combination of resources including the radio tower 167, primary backhaul (wireless coverage region 160-3), antenna elements (A61, A62, and A63), antenna interface 132-3, and virtual radio 120-3. The base-band manager 130-3 converts (such as via removal of physical layer 1 information) the received downstream communications into base-band communications 183 and transmits the base-band communications 183 to base-band manager 130-2 for further transmission downstream to intended recipients. Base-band manager 130-2 then communicates the base-band communications 183 to virtual radio 120-2 that communicates the corresponding data of the downstream communications over an appropriate carrier frequency to the communication devices 185-2 through virtual radio 120-2, antenna interface 132-2, antenna elements (A21 and A22), and base station 166.

FIG. 2 is an example diagram illustrating generation of first configuration settings to instantiate a first wireless network configuration according to embodiments herein.

Assume in this example embodiment that, at or around time T1, the base station controller hardware 140 generates configuration settings 111-1 to provide first wireless services to multiple (stationary or mobile) communication devices present in network environment 100.

For example, prior to generating configuration settings 111-1, the controller hardware 140 determines how many virtual radios (base stations, wireless access points, etc.) to instantiate in network environment 100. In this example embodiment, assume that the controller hardware 140 produces the configuration settings 111-1 to support three virtual radios, namely, virtual radios 120-1, 120-2, and 120-3.

Note again that the number of virtual radios instantiated by the controller hardware 140 depends on factors such as number of communication devices in a wireless region, bandwidth to be provided to the communication devices, amount of interference, etc. As geographical regions are newly populated with users requiring wireless connectivity, embodiments herein include instantiating additional virtual radios to accommodate wireless communications.

For each virtual radio to be instantiated, the controller 140 selects an appropriate grouping of antenna elements in antenna hardware 150 to provide a corresponding group of communication devices connectivity to a remote network 190.

As previously discussed, in one embodiment, the antenna elements in antenna hardware 150 are located at different physical positions in a 2×2 antenna element array. Controlling phases of driving an assigned grouping of antenna elements and controlling phases of received signals from the antenna elements enables a respective virtual radio (base station) to transmit and receive wireless communications in a corresponding wireless coverage region.

More specifically, in this example embodiment, the controller 140 selects a first grouping of antenna elements A11, A12, and A13 from the antenna hardware 150 to provide wireless connectivity to communication devices 185-1 in a first wireless coverage region 160-1 in the network environment 100. The controller hardware 140 assigns the first grouping of antenna elements A11, A12, and A13 and corresponding antenna interface 132-1 to the virtual radio 120-1 to enable the virtual radio 120-1 to communicate with the communication devices 185-1 in the first wireless coverage region 160-1 (first sector).

Note that instantiation of the antenna interface 132-1 and its corresponding attributes (such as one or more resources in radio communication hardware 130) as specified by the controller hardware 140 provides hardware connectivity between the instantiated virtual radio 120-1 and corresponding antenna elements A11, A12, and A13 assigned for use by virtual radio 120-1. Accordingly, via the antenna interface 132-1, the instantiated virtual radio 120-1 is able to transmit to and receive communications from communication devices 185-1 in wireless coverage region 160-1 (such as between 90 and 135 degrees).

Further in this example embodiment, the controller 140 selects a second grouping of antenna elements such as A31 and A41 of antenna hardware 150 to provide wireless connectivity (via wireless coverage region 160-2) to remote base station 166. In this example embodiment, the base station 166 (such as a small cell base station) supports wireless communications with communication devices 185-2 in the wireless coverage region 161. Wireless connectivity provided by wireless coverage region 160-2 represents a backhaul to convey communications between base station 166 and virtual radio 120-2.

The controller hardware 140 assigns the second grouping of antenna elements A31 and A41 and corresponding antenna interface 132-2 to virtual radio 120-2 to enable the virtual radio 120-2 to wirelessly communicate with the base station 166 and corresponding communication devices 185-2 in the wireless coverage region 161 over a small cell backhaul provided by wireless coverage region 160-2.

Instantiation of the antenna interface 132-2 (one or more resources in the configurable connection hardware 132) as specified by the controller hardware 140 provides hardware connectivity between instantiated virtual radio 120-2 and corresponding antenna elements A31 and A41 assigned for use by virtual radio 120-2. Accordingly, via the antenna interface 132-2, the virtual radio 120-2 is able to transmit and receive communications from communication devices 185-2 in wireless coverage region 161 via conveyance through the wireless coverage region 160-2 (such as providing wireless connectivity between 135 and 225 degrees).

In addition to selecting antenna elements and different regions of wireless coverage, the controller hardware 140 as discussed herein can be configured to select additional operating parameters such as one or more carrier frequencies to be used by each of the instantiated virtual radios 120. The carrier frequencies can be selected from a group of available carrier frequencies CF1, CF2, CF3, CF4, etc.

As previously discussed, the available one or more carrier frequencies can be defined to support LTE or other communications over the CRBS band or any other suitable band.

As shown in FIG. 2, the controller hardware 140 generates configuration settings 111-1 to indicate a first virtual radio 120-1 (base station) in the configurable resources 130 to wirelessly communicate from a first group of the antenna elements A11, A12, A13, using allocated carrier frequency CF1 and at a transmit level of 100% of a maximum possible power level; the controller hardware 140 generates configuration settings 111-1 to indicate a second (virtual) base station 120-2 in the configurable resources 130 to wirelessly communicate from a second group of the antenna elements A31 and A41, using allocated carrier frequency CF2 and at a transmit level of 100% of a maximum possible power level; the controller hardware 140 generates configuration settings 111-1 to indicate a third (virtual) base station 120-3 in the configurable resources 130 to wirelessly communicate from a third group of the antenna elements A61, A62, and A63 using allocated carrier frequency CF3 and at a transmit level of 75% of a maximum possible power level.

In one embodiment, the maximum possible power level of a respective virtual radio is defined by a communication standard that sets the limit. In one embodiment, the maximum power level is 47 dBm per 10 MHz (Megahertz) of wireless coverage, although the power can be any suitable value depending on the type of wireless communications supported by the virtual radio and corresponding assigned antenna elements.

Note that the controller hardware 140 can be configured to assign a less than maximum power level to a virtual radio (such as virtual radio 120-3 in this instance) in order to avoid or reduce interference with other virtual radios and communication devices in a particular direction.

Note again that as an alternative to assigning different carrier frequencies to each base station, further embodiments herein include assigning the same one or more carrier frequencies for use in situations where the wireless coverage regions are generally non-overlapping.

Figure 3:
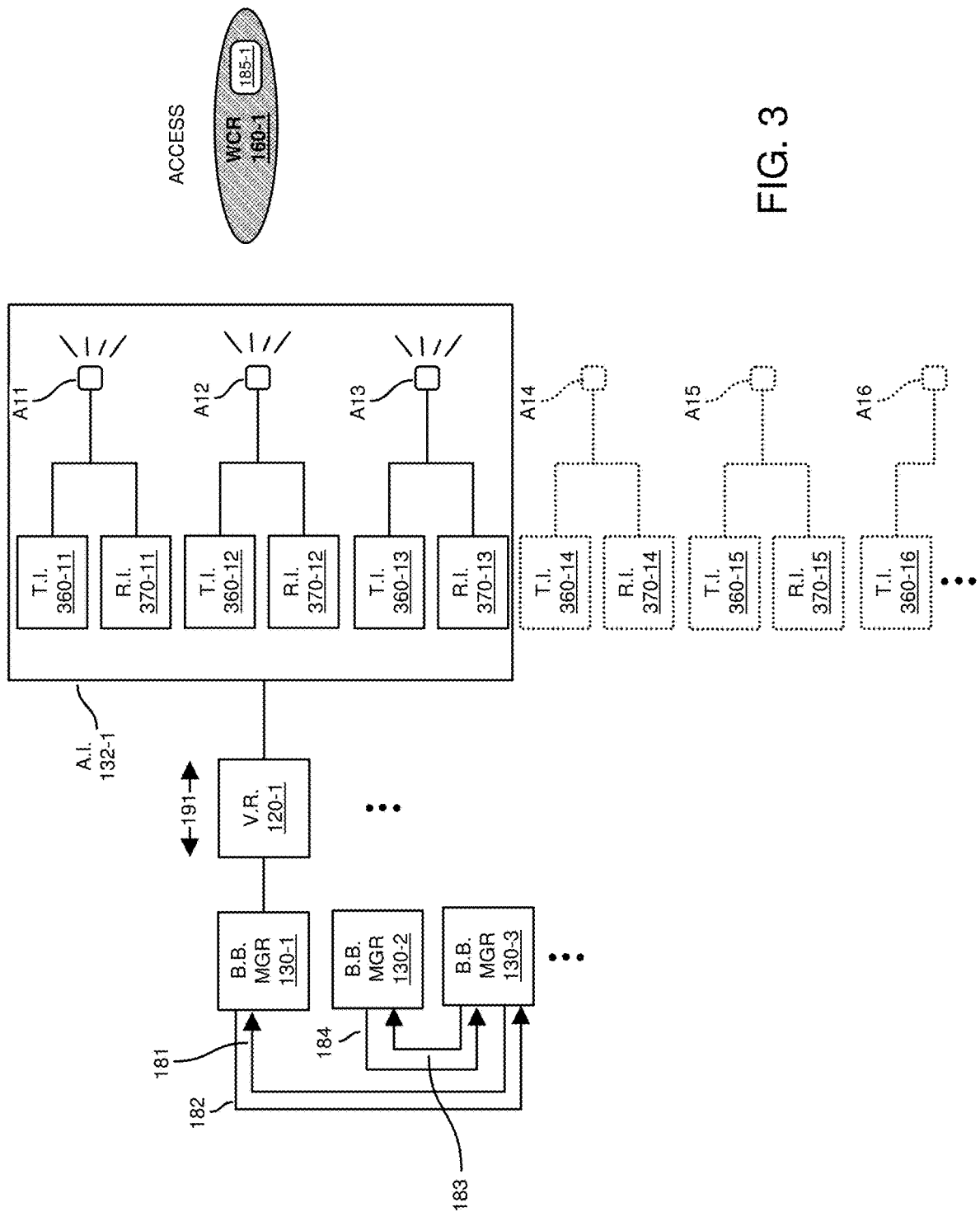
FIG. 3 is an example diagram illustrating an instantiation of a first antenna interface and corresponding antenna elements based on the first configuration settings according to embodiments herein.

FIG. 3 is an example diagram illustrating an instantiation of a first antenna interface based on the first configuration settings according to embodiments herein.

Subsequent to generation of the configuration settings 111-1 at or around time T1, the controller hardware 140 or other suitable resource applies the configuration settings 111-1 to the configurable resources 130 to provide the allocated wireless coverage as specified by the defined wireless coverage regions 160-1, 160-2, and 160-3 and corresponding sector coverage angles.

As previously discussed, the configuration settings 111-1 define physical connectivity between the virtual radios and different groupings of antenna elements.

In this example embodiment, in accordance with the configuration settings 111-1, the controller hardware 140 instantiates virtual radio 120-1, virtual radio 120-2, and virtual radio 120-3 in the configurable base station 134 of configurable resources 130 as indicated by the configuration settings 111-1. As previously discussed, the configuration settings 111-1 indicate the different resources (such as computer processor hardware, memory, software instructions, etc.) to be used to implement each of the (virtual) base stations.

Additionally, the controller hardware 140 or other suitable resource applies the configuration settings 111-1 to the configurable connection hardware 132 of the configurable resources 130 to provide the physical connectivity (as well as transmit/receive capability) between the base stations and assigned groupings of antenna elements in antenna hardware 150.

More specifically, in this example embodiment, antenna element A11 is coupled to transmitter interface 360-11 and receiver interface 370-11 of antenna interface 132-1 instantiated in configurable connection hardware 132. Transmitter interface 360-11 drives antenna element A11 to transmit a wireless signal; antenna element A11 converts received wireless signals into electrical signals conveyed to receiver interface 370-11. As shown, virtual radio 120-1 is coupled to control reception and transmission of wireless signals from antenna element A11 via transmitter interface 360-11 and receiver interface 370-11.

Antenna element A12 is coupled to transmitter interface 360-12 and receiver interface 370-12 of antenna interface 132-1 instantiated in configurable connection hardware 132. Transmitter interface 360-12 drives antenna element A12 to transmit a wireless signal; antenna element A12 converts received wireless signals into electrical signals conveyed to receiver interface 370-12. Virtual radio 120-1 is coupled to control reception and transmission of wireless signals from antenna element A12 via transmitter interface 360-12 and receiver interface 370-12.

Antenna element A13 is coupled to transmitter interface 360-13 and receiver interface 370-13 of antenna interface 132-1 instantiated in configurable connection hardware 132. Transmitter interface 360-13 drives antenna element A13 to transmit a wireless signal; antenna element A13 converts received wireless signals into electrical signals conveyed to receiver interface 370-13. Virtual radio 120-1 is coupled to control reception and transmission of wireless signals from antenna element A13 via transmitter interface 360-13 and receiver interface 370-13.

Antenna element A14 (unused in this example) is coupled to transmitter interface 360-14 and receiver interface 370-14 of configurable connection hardware 132. Transmitter interface 360-14 drives antenna element A14 to transmit a wireless signal; antenna element A14 converts received wireless signals into electrical signals conveyed to receiver interface 370-14.

Antenna element A15 (unused in this example) is coupled to transmitter interface 360-15 and receiver interface 370-15 of configurable connection hardware 132. Transmitter interface 360-15 drives antenna element A15 to transmit a wireless signal; antenna element A15 converts received wireless signals into electrical signals conveyed to receiver interface 370-15.

Antenna element A16 (unused in this example) is coupled to transmitter interface 360-16 and receiver interface 370-16 of configurable connection hardware 132. Transmitter interface 360-16 drives antenna element A16 to transmit a wireless signal; antenna element A16 converts received wireless signals into electrical signals conveyed to receiver interface 370-16.

Thus, as shown in FIG. 3, via instantiation of antenna interface 132-1 and virtual radio 120-1, the base-band manager 130-1 is able to transmit and receive wireless communications 191 over a collection of virtual radio 120-1 and assigned antenna elements A11, A12, A13. Base-band manager 130-1 is communicatively coupled to base-band manager 130-3.

Figure 4:
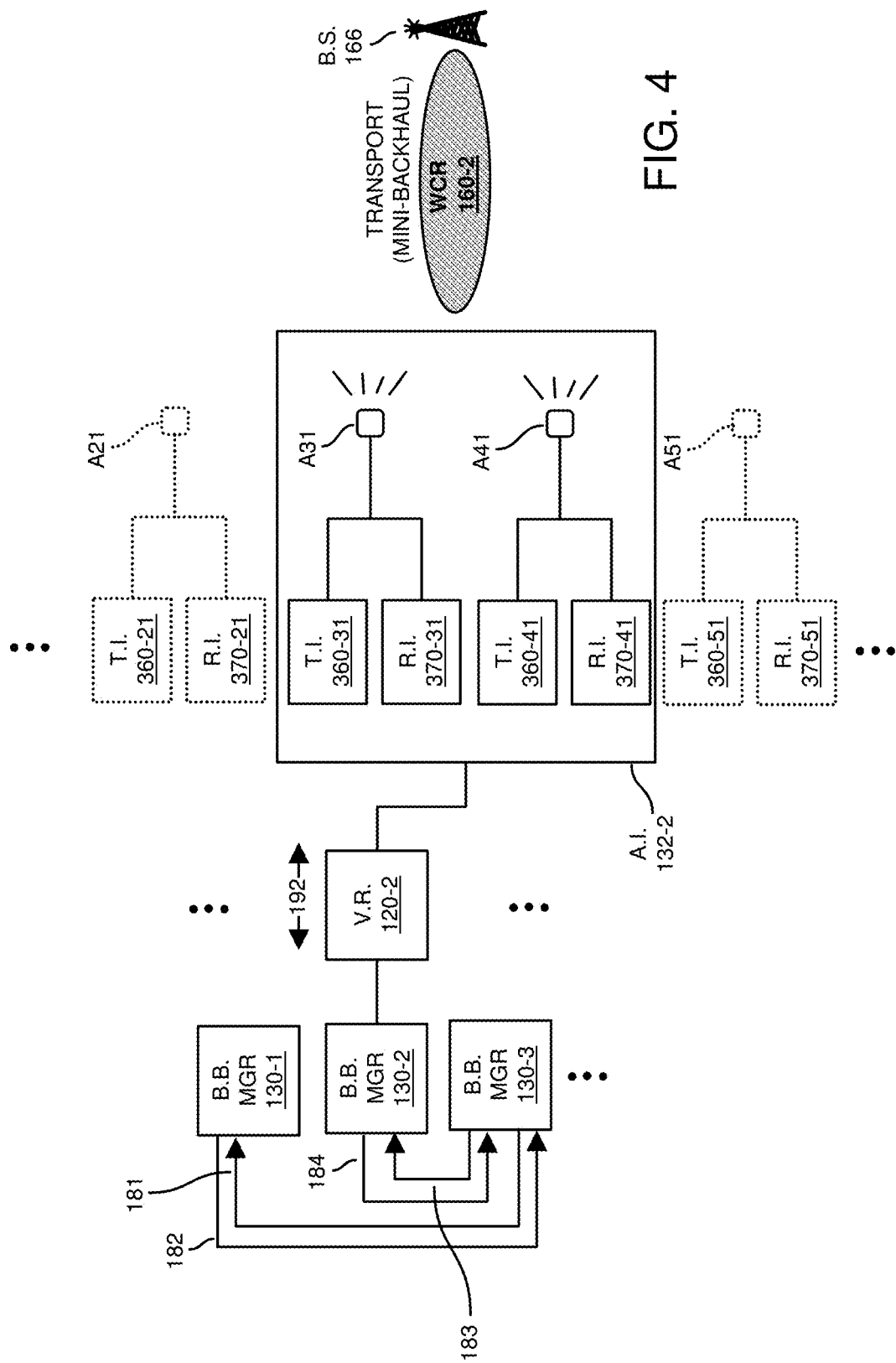
FIG. 4 is an example diagram illustrating an instantiation of a second antenna interface and corresponding antenna elements based on the first configuration settings according to embodiments herein.

FIG. 4 is an example diagram illustrating an instantiation of a second antenna interface based on the first configuration settings according to embodiments herein.

Additionally, the controller hardware 140 or other suitable resource applies the configuration settings 111-1 to the configurable connection hardware 132 of the configurable resources 130 to provide the physical connectivity (as well as transmit/receive capability) between the base stations and assigned groupings of antenna elements in antenna hardware 150.

More specifically, antenna element A21 (unused in this example) is coupled to transmitter interface 360-21 and receiver interface 370-21 in configurable connection hardware 132. Transmitter interface 360-21 is capable of driving antenna element A21 to transmit a wireless signal; antenna element A21 converts received wireless signals into electrical signals conveyed to receiver interface 370-21.

Antenna element A31 is coupled to transmitter interface 360-31 and receiver interface 370-31 of antenna interface 132-2 instantiated in configurable connection hardware 132. Transmitter interface 360-31 drives antenna element A31 to transmit a wireless signal; antenna element A31 converts received wireless signals into electrical signals conveyed to receiver interface 370-31. Virtual radio 120-2 is coupled to control reception and transmission of wireless signals from antenna element A31 via transmitter interface 360-31 and receiver interface 370-31.

Antenna element A41 is coupled to transmitter interface 360-41 and receiver interface 370-41 of antenna interface 132-2 instantiated in configurable connection hardware 132. Transmitter interface 360-41 drives antenna element A41 to transmit a wireless signal; antenna element A41 converts received wireless signals into electrical signals conveyed to receiver interface 370-41. Virtual radio 120-2 is coupled to control reception and transmission of wireless signals from antenna element A41 via transmitter interface 360-41 and receiver interface 370-41.

Antenna element A51 (unused in this example) is coupled to transmitter interface 360-51 and receiver interface 370-51 of configurable connection hardware 132. Transmitter interface 360-51 is capable of driving antenna element A51 to transmit a wireless signal; antenna element A51 converts received wireless signals into electrical signals conveyed to receiver interface 370-51.

Thus, via instantiation of antenna interface 132-2 and virtual radio 120-2, the base-band manager 130-2 is able to transmit and receive wireless communications over a combination of virtual radio 120-2 and corresponding assigned antenna elements A31 and A41. Base-band manager 130-2 is communicatively coupled to base-band manager 130-3.

Figure 5:
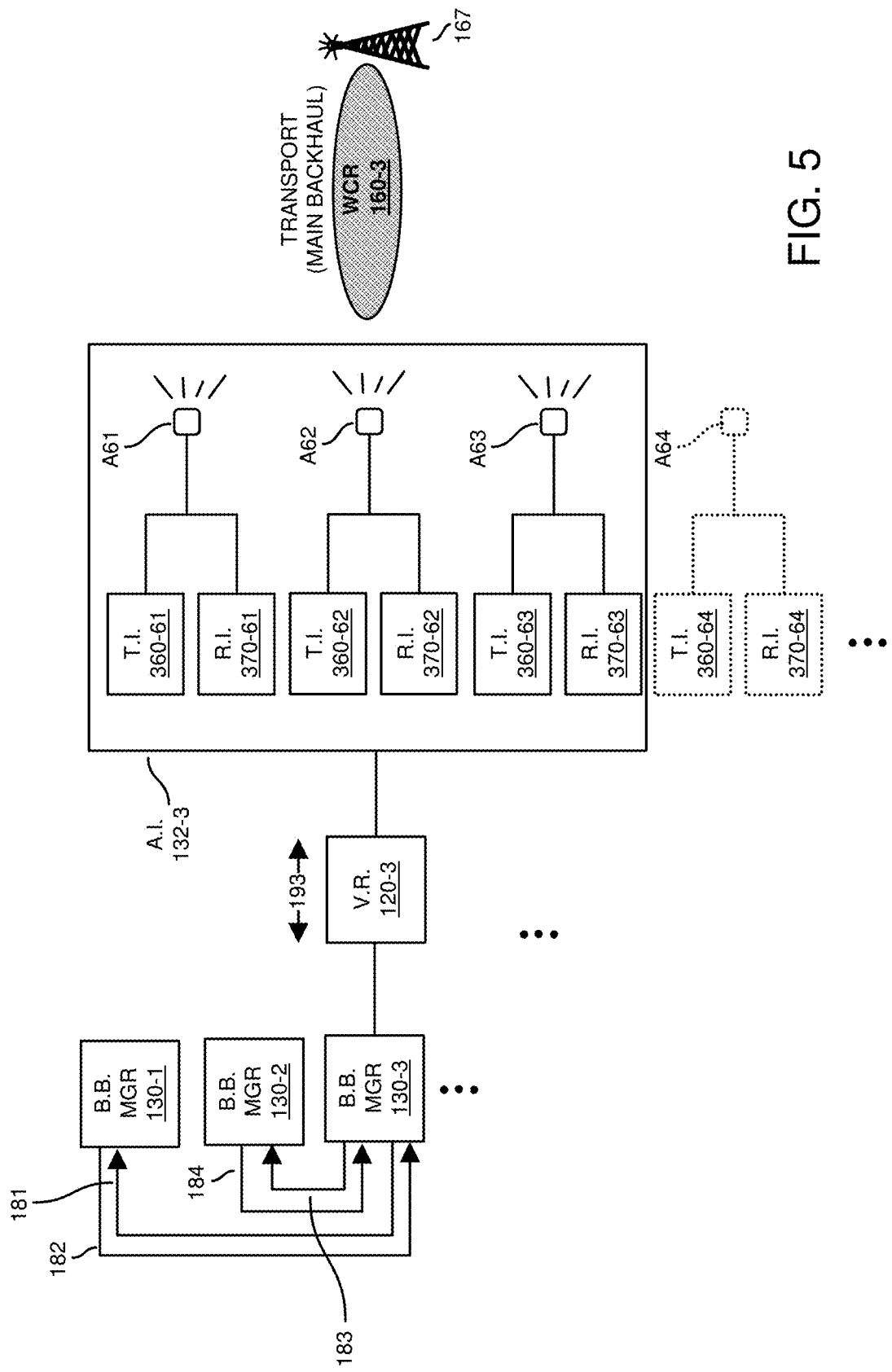
FIG. 5 is an example diagram illustrating an instantiation of a third antenna interface and corresponding antenna elements based on the first configuration settings according to embodiments herein.

FIG. 5 is an example diagram illustrating an instantiation of a third antenna interface based on the first configuration settings according to embodiments herein.

In this example embodiment, antenna element A61 is coupled to transmitter interface 360-61 and receiver interface 370-61 of antenna interface 132-3 instantiated in configurable connection hardware 132. Transmitter interface 360-61 drives antenna element A61 to transmit a wireless signal; antenna element A61 converts received wireless signals into electrical signals conveyed to receiver interface 370-61. Virtual radio 120-3 is coupled to control reception and transmission of wireless signals from antenna element A61 via transmitter interface 360-61 and receiver interface 370-61.

Antenna element A62 is coupled to transmitter interface 360-62 and receiver interface 370-62 of antenna interface 132-3 instantiated in configurable connection hardware 132. Transmitter interface 360-62 drives antenna element A62 to transmit a wireless signal; antenna element A62 converts received wireless signals into electrical signals conveyed to receiver interface 370-62. Virtual radio 120-3 is coupled to control reception and transmission of wireless signals from antenna element A62 via transmitter interface 360-62 and receiver interface 370-62.

Antenna element A63 is coupled to transmitter interface 360-63 and receiver interface 370-63 of antenna interface 132-3 instantiated in configurable connection hardware 132. Transmitter interface 360-63 drives antenna element A63 to transmit a wireless signal; antenna element A63 converts received wireless signals into electrical signals conveyed to receiver interface 370-63. Virtual radio 120-3 is coupled to control reception and transmission of wireless signals from antenna element A63 via transmitter interface 360-63 and receiver interface 370-63.

Antenna element A64 (unused in this example) is coupled to transmitter interface 360-64 and receiver interface 370-64 of configurable connection hardware 132. Transmitter interface 360-64 drives antenna element A64 to transmit a wireless signal; antenna element A64 converts received wireless signals into electrical signals conveyed to receiver interface 370-64.

Thus, via instantiation of antenna interface 132-3 and virtual radio 120-3, the base-band manager 130-3 is able to transmit and receive wireless communications over a combination of virtual radio 120-3 and assigned antenna elements A61, A62, and A63. Base-band manager 130-3 is communicatively coupled to both base-band manager 130-1 and base-band manager 130-2.

Other base-band managers, virtual radios, antenna interfaces, and antenna elements operate in a similar manner.

FIG. 6 is an example diagram illustrating a first implementation of a configurable wireless network according to embodiments herein.

As shown in FIG. 6, such as at around time T1, and instantiation of a respective wireless network 100 using configuration settings 111-1 and 112-1, path 650-1 provides connectivity between communication device 185-1 and server resources 195-1, 195-2, 195-3, etc.

More specifically, in this example embodiment, communication path 650-1 supports bi-directional connectivity of communication devices 185-1 to resources 195 through a combination of resources including assigned set of antenna elements A11, A12, and A13, antenna interface 132-1, virtual radio 120-1, base-band manager 130-1, base-band manager 130-3, virtual radio 120-3, antenna interface 132-3, antenna elements A61, A62, and A63, radio tower 167, and network 190.

Communication path 650-2 supports bi-directional connectivity of communication devices 185-2 to resources 195 through a combination of resources including base station 166, antenna elements A31 and A41, antenna interface 132-2, virtual radio 120-2, base-band manager 130-2, base-band manager 130-3, virtual radio 120-3, antenna interface 132-3, antenna elements A61, A62, and A63, radio tower 167, and network 190.

FIG. 7 is an example diagram illustrating generation of second configuration settings according to embodiments herein.

As previously discussed, conditions of a respective network environment can change over time. In accordance with further embodiments, to accommodate ever-changing network environment conditions (such as change in number of users, change in density of users in a wireless region, change in wireless bandwidth requirements, etc.), the controller hardware 140 redefines use of the configurable resources 130 and antenna hardware 150 to provide different wireless coverage in the network environment 100 depending on current network conditions as indicated by feedback 107. Thus, via the controller hardware 140, embodiments herein include: dynamically adjusting the configuration settings 111 and 112 applied to the configurable resources 130 and configurable connection hardware 132 to change a number of the multiple virtual radios (base stations or wireless access point) instantiated by the communication system over time.

Subsequent to instantiation of the configuration settings 111-1 and 112-1, assume that the feedback 107 indicates an increase in a number of or new presence of mobile communication devices in the angular range between 0 and 90 degrees at or around time T2. In response to detecting a need to instantiate another virtual radio (base station or wireless access point), the controller hardware 140 generates configuration settings 111-2 to provide the additional wireless services to one or more (stationary or mobile) communication devices 185-4 present in network environment 100.

For example, in one embodiment, the controller hardware 140 or other suitable resource determines how many virtual radios to instantiate in network environment 100. In this example embodiment, assume that the controller hardware 140 produces the configuration settings 111-2 to support four base stations, namely, virtual radios 120-1, 120-2, 120-3, and 120-4. In this example embodiment, the virtual radio 120-4 is an additional base station or wireless access point to support wireless communications.

In a similar manner as previously discussed, for each virtual radio to be instantiated, the controller 140 selects an appropriate grouping of antenna elements in antenna hardware 150 to provide a corresponding group of communication devices connectivity to a remote network 190. The antenna elements in antenna hardware 150 are located at different physical position in an array. Controlling phases of driving an assigned grouping of antenna elements and controlling phases of received signals from the antenna elements enables a respective base station to transmit and receive wireless communications in a particular wireless coverage region.

More specifically, in this example embodiment, the base station controller 140 selects a grouping of antenna elements A14, A15, and A16 from the antenna hardware 150 to provide wireless connectivity to communication devices 185-4 in wireless coverage region 160-4 in the network environment 100. Other settings are the same as previously discussed.

Instantiation of the additional antenna interface 132-4 (such as one or more resources in configurable resources 130) as specified by the controller hardware 140 provides hardware connectivity between the instantiated virtual radio 120-4 and corresponding antenna elements A14, A15, and A16 assigned for use by virtual radio 120-4. Accordingly, via the antenna interface 132-4, the instantiated virtual radio 120-4 is able to transmit to and receive communications from communication devices 185-4 in wireless coverage region 160-4 (between 0 and 90 degrees).

Note that in addition to selecting antenna elements and different regions of wireless coverage, the controller hardware 140 as discussed herein can be configured to select additional operating parameters such as one or more carrier frequencies to be used by each of the instantiated base stations 120. The carrier frequencies can be selected from a group of available carrier frequencies CF1, CF2, CF3, CF4, etc.

As previously discussed, if desired, the base station controller hardware 140 can be configured to assign a less than maximum power level to a base station (such as base station 120-3 in this instance) in order to (limit a range of communications and/or) avoid or reduce interference with other base stations and communication devices in a particular direction (such as between 225 and 270 degrees).

Figure 8:
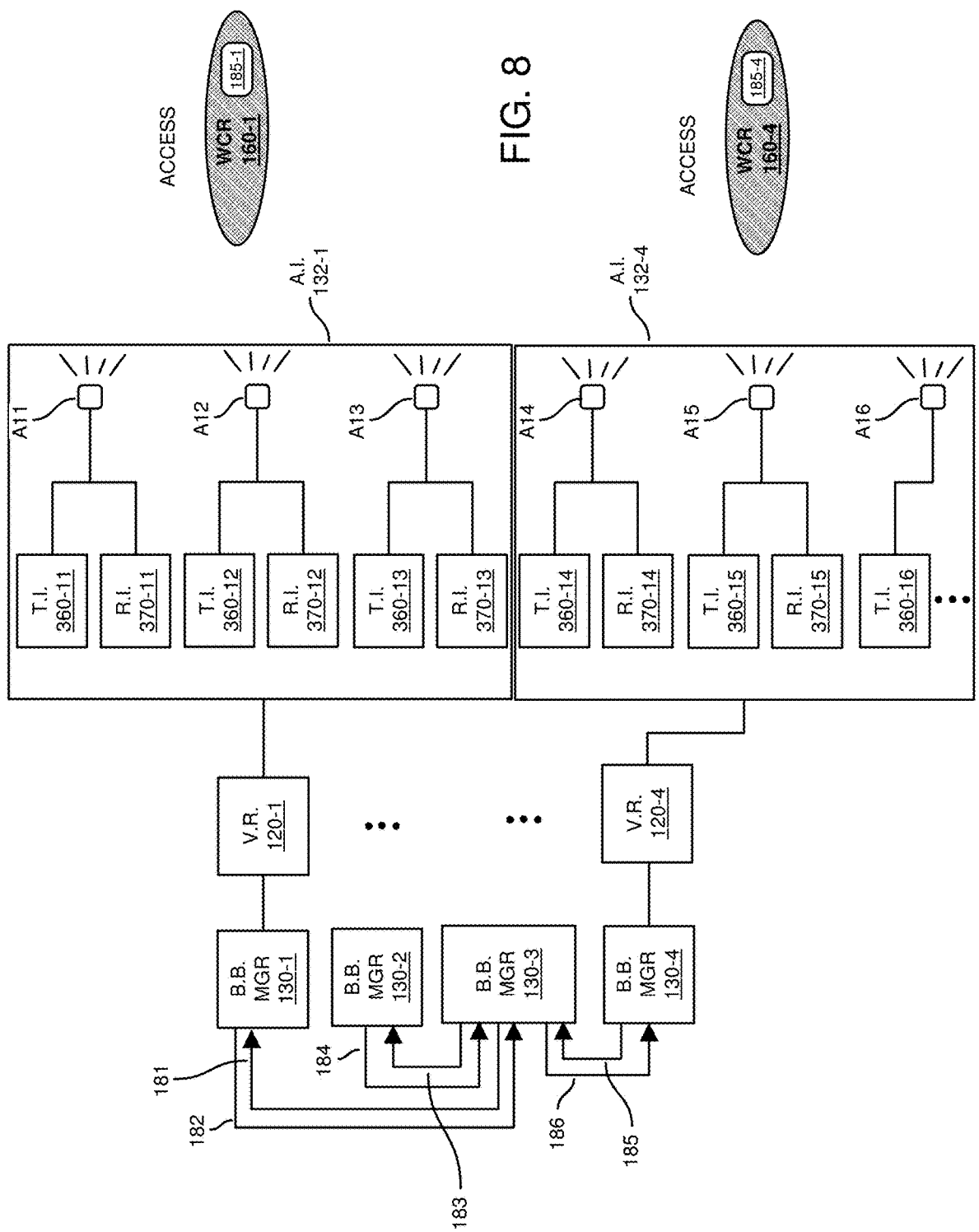
FIG. 8 is an example diagram illustrating an instantiation of a fourth antenna interface based on the second configuration settings according to embodiments herein.

FIG. 8 is an example diagram illustrating an instantiation of a fourth antenna interface based on the second configuration settings according to embodiments herein.

Subsequent to generation of the configuration settings 111-2 and 112-2, at or around time T2 (some time after time T1), the controller hardware 140 or other suitable resource applies the configuration settings 111-2 and 112-2 to the configurable resources 130 to provide the additional wireless coverage as specified by wireless coverage region 160-4.

As previously discussed, the configuration settings 111-2 define physical connectivity between the virtual radios and different groupings of antenna elements. Configuration settings 112-2 define base-band manager functionality and corresponding connectivity.

In this example embodiment, in accordance with the configuration settings 111-2, the controller hardware 140 instantiates virtual radio 120-1, virtual radio 120-2, virtual radio 120-3, virtual radio 120-4 in the configurable base station hardware 134 of configurable resources 130. As previously discussed, the configuration settings 111-2 indicate the different resources (such as computer processor hardware, memory, software instructions, etc.) to be used to implement each of the (virtual) base stations.

Additionally, the controller hardware 140 or other suitable resource applies the configuration settings 111-2 to the configurable connection hardware 132 of the configurable resources 130 to provide the physical connectivity (as well as transmit/receive capability) between the base stations and assigned groupings of antenna elements in antenna hardware 150.

As previously discussed, antenna element A11 is coupled to transmitter interface 360-11 and receiver interface 370-11 of antenna interface 132-1 instantiated in configurable connection hardware 132. Transmitter interface 360-11 drives antenna element A11 to transmit a wireless signal; antenna element A11 converts received wireless signals into electrical signals conveyed to receiver interface 370-11.

Antenna element A12 is coupled to transmitter interface 360-12 and receiver interface 370-12 of antenna interface 132-1 instantiated in configurable connection hardware 132. Transmitter interface 360-12 drives antenna element A12 to transmit a wireless signal; antenna element A12 converts received wireless signals into electrical signals conveyed to receiver interface 370-12.

Antenna element A13 is coupled to transmitter interface 360-13 and receiver interface 370-13 of antenna interface 132-1 instantiated in configurable connection hardware 132. Transmitter interface 360-13 drives antenna element A13 to transmit a wireless signal; antenna element A13 converts received wireless signals into electrical signals conveyed to receiver interface 370-13.

In accordance with the new configuration settings 111-2, antenna element A14 is coupled to transmitter interface 360-14 and receiver interface 370-14 of (new) antenna interface 132-4 instantiated in configurable connection hardware 132. Transmitter interface 360-14 drives antenna element A14 to transmit a wireless signal; antenna element A14 converts received wireless signals into electrical signals conveyed to receiver interface 370-14. Virtual radio 120-4 is coupled to control reception and transmission of wireless signals from antenna element A14 via transmitter interface 360-14 and receiver interface 370-14.

Antenna element A15 is coupled to transmitter interface 360-15 and receiver interface 370-15 of (new) antenna interface 132-4 instantiated in configurable connection hardware 132. Transmitter interface 360-15 drives antenna element A15 to transmit a wireless signal; antenna element A15 converts received wireless signals into electrical signals conveyed to receiver interface 370-15. Virtual radio 120-4 is coupled to control reception and transmission of wireless signals from antenna element A15 via transmitter interface 360-15 and receiver interface 370-15.

Antenna element A16 is coupled to transmitter interface 360-16 and receiver interface 370-16 of (new) antenna interface 132-4 instantiated in configurable connection hardware 132. Transmitter interface 360-16 drives antenna element A16 to transmit a wireless signal; antenna element A16 converts received wireless signals into electrical signals conveyed to receiver interface 370-16. Virtual radio 120-4 is coupled to control reception and transmission of wireless signals from antenna element A16 via transmitter interface 360-16 and receiver interface 370-16.

Thus, as shown in FIG. 8, via the additional instantiation of antenna interface 132-4 and virtual radio 120-4, as well as base-band manager 130-4, the base-band manager 130-4 is able to transmit and receive wireless communications over a combination of virtual radio 120-4 and assigned antenna elements A14, A15, A16. Base-band manager 130-4 is also communicatively coupled to base-band manager 130-3, supporting conveyance of communications as base-band signals 185 and 186.

FIG. 9 is an example diagram illustrating a third implementation of a configurable wireless network according to embodiments herein.

In this example embodiment, in a manner as previously discussed, a first communication path supports bi-directional connectivity of communication devices 185-1 to resources 195 through a combination of resources including antenna elements A11, A12, and A13, antenna interface 132-1, virtual radio 120-1, base-band manager 130-1, base-band manager 130-3, virtual radio 120-3, antenna interface 132-3, antenna elements A61, A62, and A63, radio tower 167, and network 190.

In a manner as previously discussed, a second communication path supports bi-directional connectivity of base station 166 to resources 195 through a combination of resources including antenna elements A21 and A22, antenna interface 132-2, virtual radio 120-2, base-band manager 130-2, base-band manager 130-3, virtual radio 120-3, antenna interface 132-3, antenna elements A61, A62, and A63, radio tower 167, and network 190.

The new communication path defined by configuration settings 111-2 and 112-2 supports bi-directional connectivity of communication devices 185-4 in wireless coverage region 160-4 to resources 195 through a combination of resources including antenna elements A14, A15, and A16, antenna interface 132-3, virtual radio 120-3, base-band manager 130-4, base-band manager 130-3, virtual radio 120-3, antenna interface 132-3, antenna elements A61, A62, and A63, radio tower 167, and network 190.

Thus, the resources including antenna elements A61, A62, and A63, antenna interface 132-3, virtual radio 120-3, and base-band manager 130-3 support is a primary (high capacity wireless) backhaul (transport) on which to support conveyance of communications associated with: i) one or more small cell or secondary backhauls (transport) such as provided by antenna elements A31, A41, antenna interface 132-2, virtual radio 120-2, and base-band manager 130-2, and ii) one or more wireless access points or base stations (for direct user device wireless access) as provided by antenna elements A11, A12, A13, antenna interface 132-1, virtual radio 120-1, and base-band manager 130-1.

Figure 10:
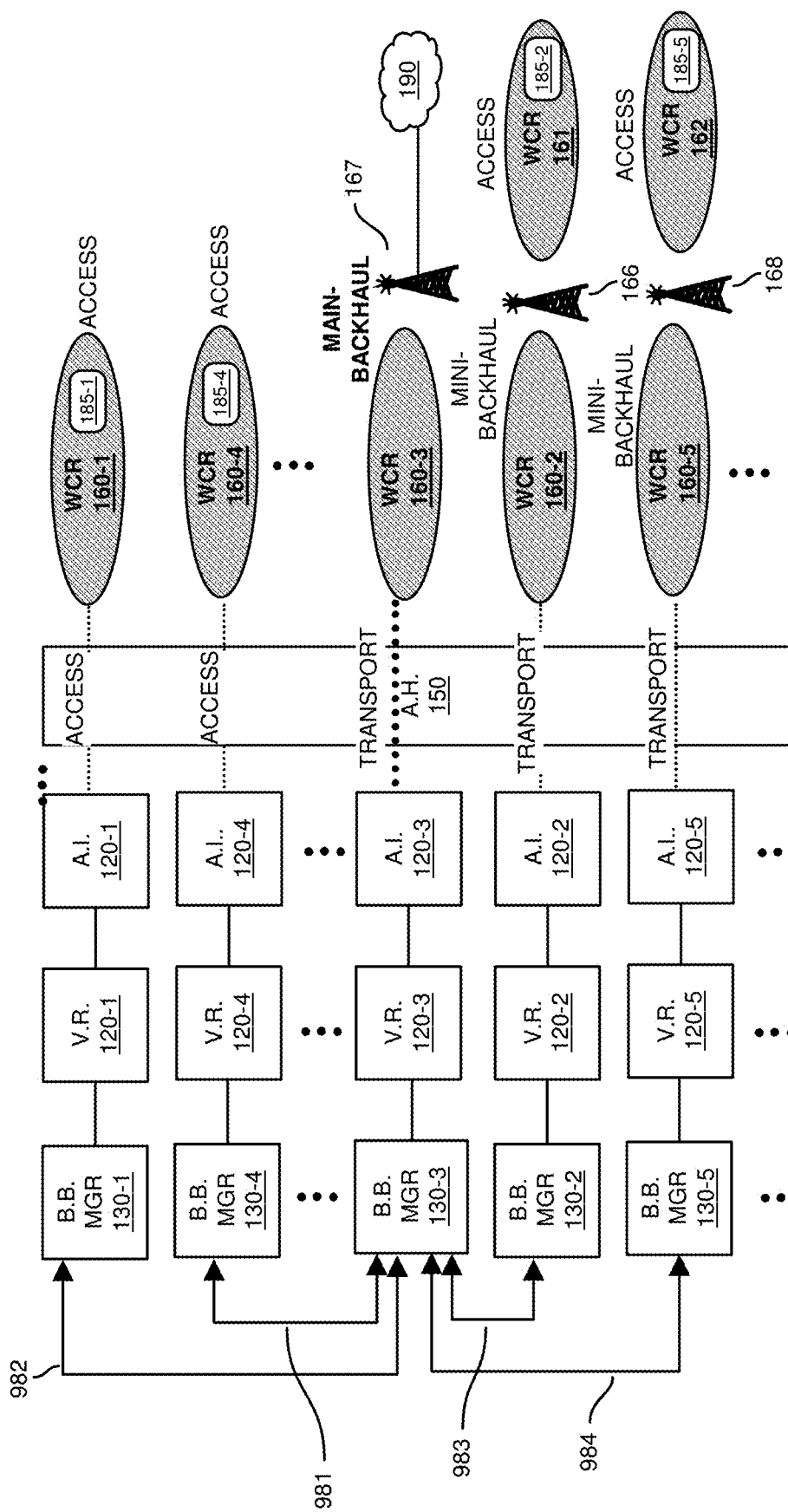
FIG. 10 is an example diagram illustrating an implementation of the configurable wireless network using the third configuration settings according to embodiments herein.

FIG. 10 is an example diagram illustrating a third implementation of a configurable wireless network according to embodiments herein.

In this example embodiment, the controller hardware 140 generates new configuration settings to instruction the communication system as shown in FIG. 10.

For example, virtual radio 120-1, antenna interface 120-1 and a corresponding assigned set of antenna elements in antenna hardware 150 support wireless coverage region 160-1 (radio access sector) to multiple communication devices 185-1. Virtual radio 120-4, antenna interface 120-4 and a corresponding assigned set of antenna elements in antenna hardware 150 support wireless coverage region 160-4 (radio access sector) to multiple communication devices 185-4.

Virtual radio 120-2, antenna interface 120-2 and a corresponding assigned set of antenna elements in antenna hardware 150 support wireless coverage region 160-2 (mini-backhaul) to base station 166 that, in turn, is in communication with communication devices 185-2. Newly established virtual radio 120-5, antenna interface 120-5 and a corresponding assigned set of antenna elements in antenna hardware 150 support wireless coverage region 160-5 (mini-backhaul) to base station 168 that, in turn, is in communication with communication devices 185-5.

In a manner as previously discussed, virtual radio 120-3, antenna interface 120-3 and a corresponding assigned set of antenna elements in antenna hardware 150 support wireless coverage region 160-3 (main-backhaul) to radio tower 167 and network 190. The main backhaul provides the mini-backhauls (transport communications) and the access paths (radio access sectors) connectivity to the remote network 190. For example, base-band manager 130-1, 130-4, etc., serving virtual radios 120-1, 120-4, etc., are communicatively coupled to base-band manager 130-3. Base-band manager 130-2, 130-5, etc., serving virtual radios 120-2, 120-5, etc., are communicatively coupled to base-band manager 130-3. More specifically, the separation between different types of coverage regions can be achieved via beam forming and/or frequency separation and/or time separation. In one embodiment, as discussed herein, the controller hardware 140 or other suitable resource controls and assigns virtual radios and antenna elements to create the different and separate beams for the different coverage regions.

Figure 11:
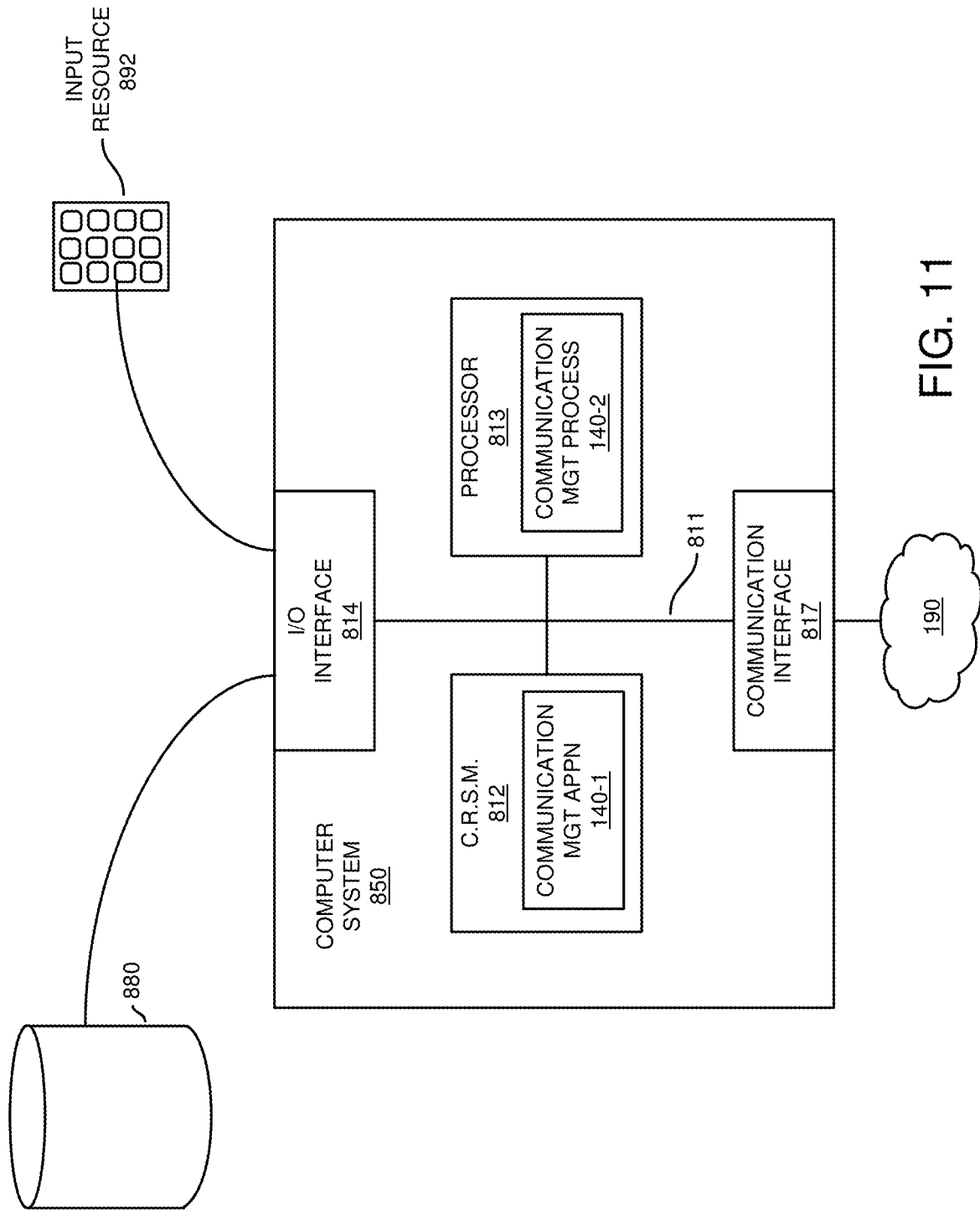
FIG. 11 is an example diagram illustrating example computer architecture operable to execute one or more operations according to embodiments herein.

FIG. 11 is an example block diagram of a computer system for implementing any of the operations as previously discussed according to embodiments herein.

Any of the resources (such as controller hardware 140, configurable resources 130, configurable connection hardware 132, configurable base station harder 134, antenna hardware 150, one or more communication devices, etc.) as discussed herein can be configured to include computer processor hardware and/or corresponding executable instructions to carry out the different operations as discussed herein.

As shown, computer system 850 of the present example includes an interconnect 811 that couples computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with communication management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the communication management application 140-1 produces communication management process 140-2 to carry out any of the operations and/or processes as discussed herein.

Those skilled in the art will understand that the computer system 850 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 12-13. Note that the steps in the flowcharts below can be executed in any suitable order.

Figure 12:
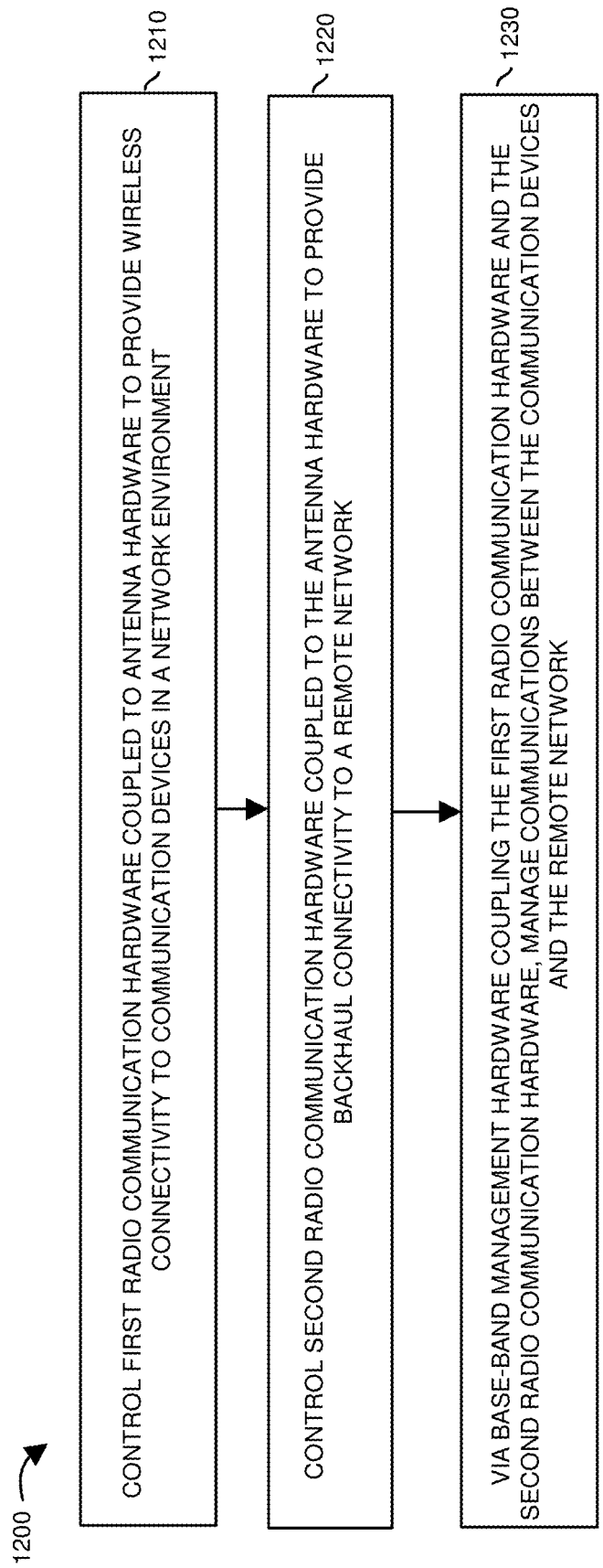

FIG. 12 is a flowchart 1200 illustrating an example method according to embodiments. Note that there will be some overlap with respect to concepts as discussed above.

In processing operation 1210, the controller 140 controls first radio communication hardware (such as a first portion of configurable connection hardware 132 and/or configurable base station hardware 134) coupled to the antenna hardware 150 to provide wireless connectivity to communication devices 185 in a network environment 100.

In processing operation 1220, the controller 140 controls second radio communication hardware (such as a second portion of configurable connection hardware 132 and/or configurable base station hardware 134) coupled to the antenna hardware 150 to provide backhaul connectivity to a remote network.

In processing operation 1230, the controller 140 instantiates base-band management hardware (such as base-band managers 130) to couple the first radio communication hardware and the second radio communication hardware. As discussed herein, the base-band managers 130 manage communications between the communication devices and the remote network.

FIG. 13 is a flowchart 1300 illustrating an example method according to embodiments. Note that there will be some overlap with respect to concepts as discussed above.

In processing operation 1310, the base-band manager 130-1 converts communications 191 received over first radio communication hardware (such as antenna interface 132-1 and virtual radio 120-1) into first base-band signals 182. In one embodiment, the received communications 191 originate from communication devices 185-1 in a wireless coverage region 160-1.

In processing operation 1320, the base-band manager 130-2 converts second communications 192 received over second radio communication hardware (such as antenna interface 132-2 and virtual radio 120-2) into base-band signals 184. In one embodiment, the communications 192 originate from second communication devices 185-2 in a wireless coverage region 161.

In processing operation 1330, the base-band manager 130-3 receives and communicates contents of the base-band signals 182 and the base-band signals 184 through third radio communication hardware (such as virtual radio 120-3, antenna interface 132-3, and antenna elements A61, A62, and A63) as third communications 193 over a primary backhaul provided by wireless coverage region 160-3 to and through radio tower 167 to remote network 190.

In processing operation 1340, the base-band manager 130-3 converts communications 193 received over the third radio communication hardware (such as antenna elements A61, A62, and A63, antenna interface 132-3, and virtual radio 120-3) from resources (such as 195-1, resource 195-2, etc.) in remote network 190 into base-band signals 181.

In processing operation 1350, the base-band manager 130-3 communicates the base-band signals 181 to base-band manager 130-1. Base-band manager 130-1 communicates the contents of base-band signals 181 through the first radio communication hardware (such as virtual radio 120-1, antenna interface 132-1, and antenna elements A11, A12, and A13) as communications 191 to the first mobile communication devices 185-1.

In processing operation 1360, the base-band manager 130-3 converts communications 193 received over the third radio communication hardware (such as antenna elements A61, A62, and A63, antenna interface 132-3, and virtual radio 120-3) from the remote network 190 into base-band signals 183.

In processing operation 1370, the base-band manager 130-3 communicates the base-band signals 183 to the base-band manager 130-2. The base-band manager 130-2 communicates the base-band signals 183 through the second radio communication hardware (such as virtual radio 120-2, antenna interface 132-2, and antenna elements A21 and A22) as communications 192 to the communication devices 185-2.

Note again that techniques herein are well suited to facilitate dynamic implementation of base stations, antenna elements, base-band managers, and allocation of wireless bandwidth in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A system comprising:
   antenna hardware including multiple antenna elements, each of the multiple antenna elements assignable for use amongst different instances of radio communication hardware;
   first radio communication hardware, the first radio communication hardware assigned use of a first portion of the multiple antenna elements, the first portion of the multiple antenna elements providing first wireless connectivity to communication devices in a network environment;
   second radio communication hardware assigned a second portion of the multiple antenna elements, the second radio communication hardware coupled through the second portion of the multiple antenna elements to a primary backhaul providing connectivity to a remote network; and
   base-band management hardware coupling the first radio communication hardware and the second radio communication hardware, the base-band management hardware operable to manage communications between the communication devices and the remote network;
   wherein a combination of the first radio communication hardware and the first portion of the multiple antenna elements in the antenna hardware supports wireless network access to a first portion of the mobile communication devices and backhaul transport to a second portion of the mobile communication devices; and
   wherein a combination of the second radio communication hardware and the second portion of the multiple antenna elements in the antenna hardware supports main communication transport over the primary backhaul for both the wireless network access and the backhaul transport.

2. The system as in claim 1, wherein the first portion of the multiple antenna elements provides the first wireless connectivity to a first wireless coverage region; and
   wherein the second portion of the multiple antenna elements provides the primary backhaul via a second wireless coverage region.

3. The system as in claim 2, wherein the first portion of the multiple antenna elements and the second portion of the multiple antenna elements reside in an antenna array disposed in the antenna hardware.

4. The system as in claim 1 further comprising:
   a controller operable to: i) receive first input indicating first wireless coverage to be provided by the first radio communication hardware, ii) receive second input indicating second wireless coverage to be provided by the second radio communication hardware, and iii) generate configuration settings to instantiate the first radio communication hardware and the second radio communication hardware.

5. The system as in claim 4, wherein the configuration settings for the first radio communication hardware defines: i) attributes of wireless access sectors used by the first portion of the mobile communication devices, and ii) attributes of transport sectors to respective wireless subscriber-networks.

6. The system as in claim 1, wherein the base-band management hardware is operable to convert first communications received from a mobile communication device over the first radio communication hardware into first base-band signals that are re-transmitted over the second radio communication hardware through the primary backhaul to the remote network; and
   wherein the base-band management hardware is operable to convert second communications received from the remote network over the primary backhaul and the second radio communication hardware into second base-band signals that are re-transmitted over the first radio communication hardware to the mobile communication devices.

7. The system as in claim 1 further comprising:
   a controller operable to dynamically adjust data flow capacity and wireless coverage supported by the first radio communication hardware amongst multiple wireless sectors in which the communication devices reside.

8. The system as in claim 1, wherein the primary backhaul is a wireless link supporting bi-directional communications.

9. The system as in claim 1, wherein both the first radio communication hardware and the second radio communication hardware are instantiated from a combination of configurable connection hardware and configurable base station hardware disposed between the antenna hardware and the base-band management hardware.

10. The system as in claim 1, wherein the first portion of the multiple antenna elements provide first wireless coverage in a first direction outward with respect to the antenna hardware; and
    wherein the second portion of the multiple antenna elements provide second wireless coverage in a second direction outward with respect to the antenna hardware.

11. The system as in claim 1, wherein the communications include first base-band communications and second base-band communications;
    wherein the first base-band communications are derived from first wireless signals generated by the communication devices, the first wireless signals including the first base-band communications transmitted over a first carrier frequency; and
    wherein the second base-band communications are derived from second wireless signals received over the primary backhaul, the second wireless signals including the second base-band communications transmitted over a second carrier frequency.

12. The system as in claim 1 further comprising:
    a controller operative to reassign the multiple antenna elements for use by third radio communication hardware.

13. The system as in claim 1, wherein the base-band management hardware includes an instantiation of a first base-band manager assigned to the first radio communication hardware and an instantiation of a second base-band manager assigned to the second radio communication hardware.

14. The system as in claim 13, wherein the first base-band manager and the second base-band manager are instantiated from co-located configurable base-band hardware.

15. The system as in claim 1, wherein the antenna hardware is disposed at a single central location.

16. The system as in claim 15, wherein each of the first portion of the antenna elements and the second portion of the antenna elements transmit at a maximum wireless power level.

17. The system as in claim 15, wherein the first portion of the antenna elements is assigned to wirelessly communicate at a first carrier frequency; and wherein the second portion of the antenna elements is assigned to wirelessly communicate at a second carrier frequency.

18. The system as in claim 1, wherein the antenna hardware supports communications in different angular directions with respect to a single central location at which the antenna hardware resides.

19. The system as in claim 9 further comprising:

a controller operative to instantiate third radio communication hardware from the configurable connection hardware and the configurable base station hardware disposed between the antenna hardware and the base-band management hardware, the third radio communication hardware assigned a third portion of the antenna elements in the antenna hardware to communicate with a third region of wireless coverage.

20. A method comprising:

controlling first radio communication hardware coupled to shared antenna hardware to provide wireless connectivity to communication devices in a network environment;

controlling second radio communication hardware coupled to the shared antenna hardware to provide backhaul connectivity to a remote network;

via base-band management hardware coupling the first radio communication hardware and the second radio communication hardware, managing communications between the communication devices and the remote network;

wherein a combination of the first radio communication hardware and a first portion of antenna elements in the shared antenna hardware supports wireless network access to a first portion of the mobile communication devices and backhaul transport to a second portion of the mobile communication devices; and wherein a combination of the second radio communication hardware and a second portion of antenna elements in the shared antenna hardware supports main communication transport over the backhaul connectivity for the wireless network access and the backhaul transport.

21. The method as in claim 20, wherein the first portion of antenna elements provides wireless connectivity to a first wireless coverage region; and wherein the second portion of antenna elements provides wireless connectivity to a second wireless coverage region.

22. The method as in claim 21, wherein the first portion of antenna elements and the second portion of antenna elements reside in an antenna array of the shared antenna hardware.

23. The method as in claim 20 further comprising:

a controller operable to: i) receive input indicating first wireless coverage to be provided by the first radio communication hardware, ii) receive input indicating second wireless coverage to be provided by the second radio communication hardware, and iii) generate configuration settings to instantiate the first radio communication hardware and the second radio communication hardware.

24. The method as in claim 23, wherein the configuration settings for the first radio communication hardware defines: i) attributes of wireless access sectors used by the first portion of the mobile communication devices, and ii) attributes of transport sectors to respective wireless subscriber-networks.

25. The method as in claim 20, wherein the base-band management hardware is operable to convert first communications received from a mobile communication device over the first radio communication hardware into first base-band signals that are re-transmitted over the second radio communication hardware through the backhaul connectivity to the remote network; and wherein the base-band management hardware is operable to convert second communications received from the remote network over the backhaul connectivity and the second radio communication hardware into second base-band signals that are re-transmitted over the first radio communication hardware to the mobile communication devices.

26. The method as in claim 20 further comprising:

a controller operable to dynamically adjust data flow capacity and wireless coverage supported by the first radio communication hardware amongst multiple wireless sectors in which the multiple communication devices reside.

27. Computer-readable storage hardware having instructions stored thereon, the instructions, when carried out by computer processor hardware, cause the computer processor hardware to:

control first radio communication hardware coupled to shared antenna hardware to provide wireless connectivity to communication devices in a network environment;

control second radio communication hardware coupled to the shared antenna hardware to provide backhaul connectivity to a remote network;

via base-band management hardware coupling the first radio communication hardware and the second radio communication hardware, manage communications between the communication devices and the remote network;

wherein a combination of the first radio communication hardware and a first portion of antenna elements in the shared antenna hardware supports wireless network access to a first portion of the mobile communication devices and backhaul transport to a second portion of the mobile communication devices; and wherein a combination of the second radio communication hardware and a second portion of antenna elements in the shared antenna hardware supports main communication transport for the wireless network access and the backhaul transport.

\* \* \* \* \*